Aug. 10, 1965 G. SHAHEEN 3,199,194

CAST CUTTER

Filed Jan. 6, 1964 2 Sheets-Sheet 1

INVENTOR.
GEORGE SHAHEEN
BY
*McLaughlin & Cahill*
ATTORNEYS

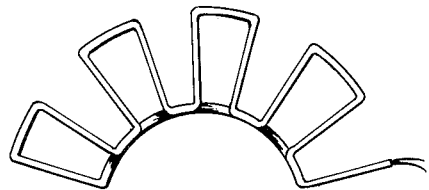
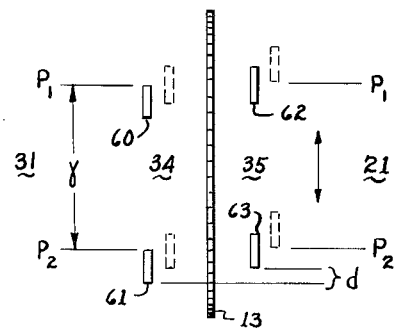
fig. 5
fig. 7
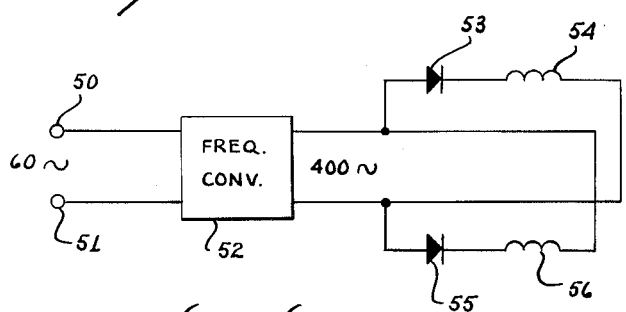
fig. 6
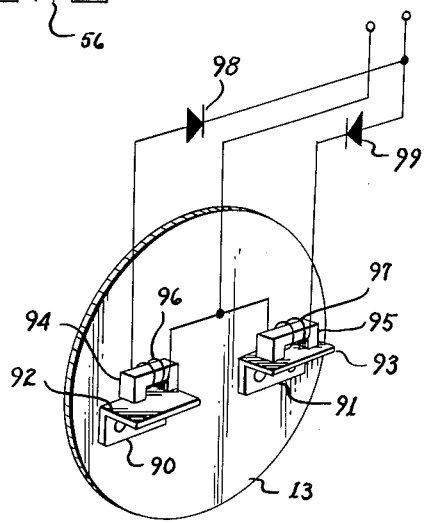
fig. 8
fig. 9

United States Patent Office 3,199,194
Patented Aug. 10, 1965

3,199,194
CAST CUTTER
George Shaheen, Phoenix, Ariz., assignor to
W. A. Bishop, Jr.
Filed Jan. 6, 1964, Ser. No. 335,863
13 Claims. (Cl. 30—276)

The present invention pertains to surgical instruments, and more specifically, to a surgical cutter of the type suitable for removing plastic casts from patients.

In the past, rotating and oscillating cutters have been used to cut through the plaster material of casts commonly used in present day medical practice. It was found that the prior art cutters were dangerous, not only to the patient but also to the physician or attendant removing the cast. To alleviate the dangers involved, rotating cast cutters were abandoned and the oscillating type of cast cutter was redesigned to provide an oscillation of a drastically limited angular displacement.

The cast cutters presently designed to provide this limited angular oscillation are generally bulky, and extremely noisy, having been developed on the principle of conversion from rotating to oscillatory motion through a variety of mechanical transducing means. The bulkiness of prior art cutters renders them unwieldy and awkward to use; further, the noise generated in their use is extremely annoying to the operator and frightening to the patient.

Accordingly, it is an object of the present invention to provide a quieter operating cast cutter.

It is also an object of the present invention to provide a cast cutter utilizing the generation of an alternating magnetic field to directly provide angular oscillations.

It is still another object of the present invention to provide a cast cutter that is light weight and which may be provided with a means for removing dust and particles dislodged by the cutting blade when the cutter is in use.

Further objects and advantages of the present invention will become apparent to those skilled in the art as the description thereof proceeds.

Briefly, in accordance with one embodiment of the present invention, a pair of stators are provided and are shaped into the form of an arc. The stators are axially displaced from each other and are placed on opposite sides of a cutting blade. A pair of rotors, each semicircular in shape, and each having a digitated circumference to provide radially extending teeth, are placed on either side of the cutting blade between the blade and the corresponding stator. The rotors are secured to the blade and are rotatable therewith. The windings of the two stators are connected, each to receive a different half wave of a half wave rectified alternating current. The radially extending teeth of the two armatures are angularly displaced so that when a given stator is energized, the corresponding armature will rotate about the cutting blade axis to a given position. Upon energization of the opposite stator, the opposite armature will rotate to align itself with the magnetic field established by the second stator. The repeated alternating energization of the respective stators, and the alternating magnetic field established thereby, causes the armatures to oscillate about the axis of the cutting blade and thereby imparts an acceleration to cause the cutting blade to oscillate.

The present invention may more readily be described by reference to the accompanying drawings in which:

FIGURE 5 is a schematic representation of a suitable stator winding for use in the stators of the cast cutter of the present invention;

FIGURE 6 is a schematic illustration showing a circuit diagram suitable for use with the cast cutter of the present invention;

FIGURE 7 is a schematic diagram useful in describing the operation of the device of the present invention;

FIGURE 8 is a modification of the mechanism of FIGURE 4;

FIGURE 9 is a further modification of the mechanism of FIG. 4.

Figure 1:
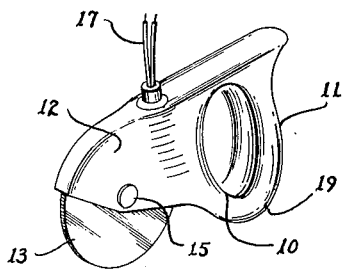
FIGURE 1 is a perspective view of a cast cutter constructed in accordance with the teachings of the present invention.

Referring now to FIG. 1, a mounting frame 10 is provided having a handle portion 11 and a mechanism-supporting portion 12. A cutting blade 13 is shown mounted in the support frame and is journaled for rotation about an axis 15. A suitable electric cord 17 extends from the frame for connection to an appropriate power source. The supporting frame is shaped to provide a suitable pivoting surface 19 that has been found to be convenient for gauging the depth of the cutting blade when the cutter is in use. The mounting frame may conveniently be constructed from a variety of materials such as plastic, stainless steel, etc.

Figure 2:
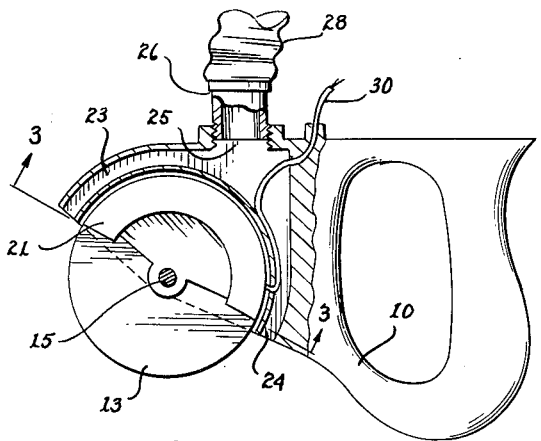
FIGURE 2 is a side elevational view, partly in section, of the cast cutter of FIG. 1.

Referring to FIG. 2, the supporting frame 10 has been sectioned throughout a portion thereof to more clearly show some of the features of the present invention. The cutting blade 13 is mounted for rotation about an axis 15; a stator 21, formed to an accurate shape, is axially displaced from the cutting blade 13 and is supported by the frame 10. Vacuum ducts 23 and 24 are provided integral with the frame 10 and are positioned adjacent the cutting blade 13. The ducts 23 and 24 are connected through a suitable coupling device 26 that may readily be attached to the frame 10. A vacuum hose 28 may then be connected to a suitable source of evacuation to thereby draw the particles of dust and debris dislodged by the blade 13 away from the work area of the cast cutter. The electrical conductors 30 may be brought out from the stators in any convenient manner. The embodiment shown in FIG. 2 includes vacuum means for removing particles dislodged by the blade; however, the opening provided for attachment to a source of vacuum may be plugged by a threaded insert.

Figure 3:
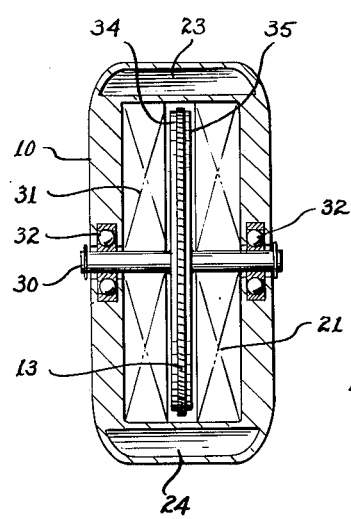
FIGURE 3 is a sectional view of FIG. 2 taken along lines 3—3.

Referring to FIG. 3, the frame 10 is shown with the openings 23 and 24 provided therein. A shaft 30 is removably mounted in openings provided in the frame. The shaft is supported at either end thereof by bearings 32. The stator 21 is axially displaced from the blade 13 and is secured to the frame 10. An oppositely disposed stator 31 is also axially displaced from the blade 13 and is supported by the frame 10. The two stators 21 and 31 are positioned on opposite sides of the blade and have opposing pole faces. A pair of rotors 34 and 35 are secured to opposite sides of the blade 13 and are in opposing relation with the respective faces of the corresponding stators. The stator-rotor relationship may more readily be seen by reference to FIG. 4.

Figure 4:
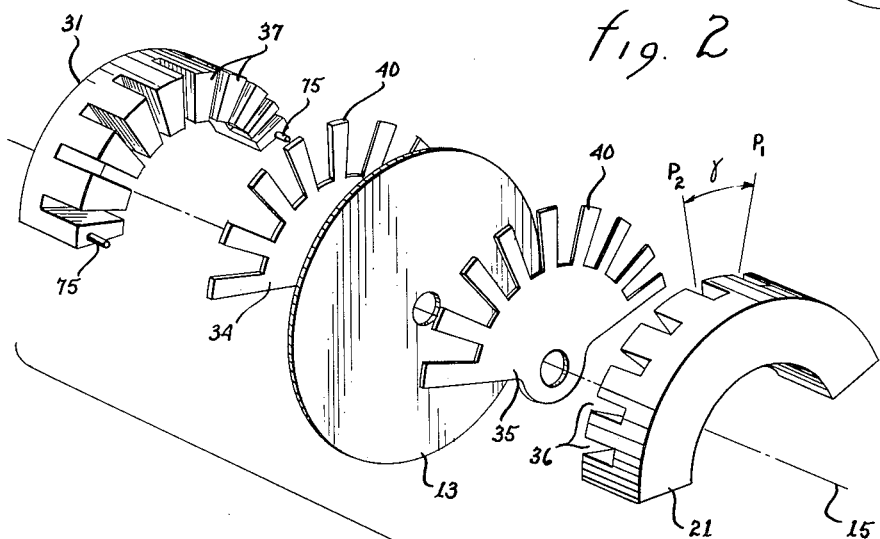
FIGURE 4 is an illustration of the stators, rotors, and cutting blade arranged in accordance with the teachings of the present invention and presented in an exploded view.

Referring to FIG. 4, the cutting blade 13 is mounted for rotation about the axis 15. The stator 21 comprises a plurality of laminated sheets of high permeability steel formed into an arcuate shape and notched such as that shown at 36 to provide slots to accept stator windings. The stator 31 is similarly shaped and is mounted with the pole faces thereof opposing the pole faces of the stator 21. The notches or slots 36 yield pole faces 37 that form a portion of a sector. The two stators 21 and 31 are displaced axially along the axis 15 on opposite sides of the blade 13.

The rotors 34 and 35 are also mounted for rotation about the axis 15. Each of the rotors are accurately shaped and may be formed from materials such as solid soft iron. The periphery or circumference of each of the rotors is digitated to provide radially extending teeth 40, each corresponding to a stator slot.

The rotors 34 and 35 are secured to the cutting blade 13 in any convenient manner such as by keying the rotors and the blade to a shaft such as that shown at 30 in FIG. 3. The stators 21 and 31 are secured to the support frame and the entire assembly is mounted within the support frame as shown in FIGS. 2 and 3. The windings, to be placed in the slots provided therefor in stator 21 and 31, may take the form of the windings shown in FIG. 5. The stators 21 and 31 may conveniently be manufactured by making the stator in circular form and cutting the circular stator along a diameter to thereby provide the arcuate shapes shown in FIG. 4. The windings shown in FIG. 5 may be wound and formed prior to insertion in the respective stator half.

The armatures 34 and 35 are mounted relative to each other with the respective teeth 40 angularly displaced; that is, the center tooth of the rotor 35 will be displaced a given angular distance from the center tooth of the rotor 34. Altenatively, the teeth of the two rotors may be mounted in relative angular alignment and the stators 21 and 31 may be mounted with their respective pole faces angularly displaced. The purpose for the angular displacement will become apparent as the description of operation is given.

The operation of the present invention requires the alternate energization of the respective stators to cause the corresponding rotors to rotate about the axis 15 in alternate alignment with the generated magnetic fields. To alternately energize the two stators, a circuit may be utilized such as that shown in FIG. 6. Terminals 50 and 51 may be connected to a conventional 115 volt, 60 cycle power outlet. The conventional 60 cycle alternating current is applied to a frequency converter 52 for conversion into an alternating current having a frequency of 400 cycles per second. The frequency converter 52 is of conventional design and is a relatively simple device with a great number of appropriate devices readily available on the market. The output of the frequency converter 52 is applied through a diode 53 to stator winding 54; the output is also applied through diode 55 to stator winding 56. The diodes 53 and 55 each half wave rectify the 400 cycle alternating current provided by the frequency converter 52. The polarity of the respective diodes provide a different one-half of the rectified current to the respective windings 54 and 56. Accordingly, the windings 54 and 56 are placed on the stators 21 and 31 where the alternate energization of the respective windings provides the alternate generation of a magnetic field. The cast cutter of the present invention may be used without a frequency converter and will operate satisfactorily with the use of conventional 60 cycle alternating current; however, for most efficient operation, it has been found that a rate of oscillation of approximately 20,000 oscillations per minute is desirable. Therefore, a frequency conversion from 60 to 400 cycles per second permits the generation of an oscillating frequency of 24,000 oscillations per minute.

The operation of the present invention will be described with the aid of FIG. 7. When power is supplied to the frequency converter, and alternate half cycles of the impressed alternating current are provided to each of the stators 21 and 31, a magnetic field is generated tending to cause the corresponding rotor to align itself in the magnetic field. Referring to FIG. 7, the cutting blade 13 is shown and is flanked by teeth 60 and 61 of rotor 34 and teeth 62 and 63 of rotor 35. The axial distance between the respective rotors and the blade have been greatly exaggerated in FIG. 7 to facilitate the description of operation. The dashed lines $p_1$—$p_1$ and $p_2$—$p_2$ represent slot centers on the faces of the opposing stators. The center to center distance between the slots in indicated in FIG. 7 as $\gamma$. It is assumed in FIG. 7, that stator 31 and rotor 34 are on the left and stator 21 and rotor 35 are on the right. The two rotors are secured to the cutting blade 13 with the respective teeth thereof angularly displaced a distance indicated in FIG. 7 as "$d$." The angular displacement provided between the respective rotors is intended to permit an angular displacement of the armature and cutting blade for each half cycle of alternating current impressed on the cutter of the present invention. When the stator 21 is energized, the magnetic field established thereby attracts the rotor 35 to the position shown in FIG. 7. The radially extending teeth 62 and 63 center themselves on the slot center lines and thus impart acceleration to the cutting blade 13 to cause it to assume the position shown. During the next half cycle of the impressed alternating current, the stator 21 is de-energized and stator 31 is energized. Accordingly, rotor 34, and radially extending teeth 60 and 61, are urged into alignment with the slot center lines to a position shown in FIG. 7 by dotted lines. Since the rotor 34 is secured to the cutting blade 13, and the cutting blade is secured to the rotor 35, the entire rotor-cutting blade assembly is rotated until the teeth assume the position shown in FIG. 7 by the dotted lines. It will be noted that the dotted positions shown in FIG. 7 are laterally displaced to the right; there is no lateral displacement in the device of the present invention, the displacement of FIG. 7 merely being shown to facilitate the description of operation. When the stator 31 is de-energized upon the occurrence of a next half cycle of the alternating current, stator 21 is energized and the armature 35 will once again assume the position shown by the solid lines of FIG. 7. Thus, the angular displacement represented in FIG. 7 by "$d$" permits angular oscillation of the rotor-cutting blade assembly in response to the alternating magnetic field established by the stators 21 and 31. This angular displacement may be adjusted to any suitable value; it has been found that an angular oscillation with a total displacement of seven mechanical degrees is particularly suitable for the purposes intended.

Utilizing the design shown and described in FIGS. 1–7, a cast cutter is provided that is completely safe and may be grasped by the fingers of the hand without incurring injury. When a cast is being removed, if the blade should encounter the patient's flesh, or touch the physician's hand, no damage will be done and no injury incurred. Although the cutting blade will continue to oscillate though it is grasped, the blade will not cut any yielding substance and will only cut a relatively britte or non-yielding substance such as plaster. The cutting blade 13, and rotors attached thereto, may be prevented from rotating greater than seven degrees by any convenient means such as a mechanical stops shown in FIG. 4 at 75. One of these mechanical stops placed adjacent either edge of the rotor 34 will prevent the rotor-cutting blade assembly from rotating (when not in use) to a position where the magnetic field will not be correctly oriented with the respective rotors.

It will be obvious to those skilled in the art that while the diagram of FIG. 7 illustrates the rotors having an angular displacement, the rotors may be aligned and the stators may be provided with an angular displacement. Therefore, the design of the present invention provides a cast cutter having no mechanical transducing means for translating rotational into oscillatory motion and is therefore exceedingly quiet in operation and compact in shape. The cutting blade is shown as a circular saw toothed blade; however, a different shaped blade may be used, although the use of a circular blade as shown provides distinct advantages. Since the saw blade is oscillated through an angle of only 7 degrees, approximately 180 degrees of the blade circumference is used. Accordingly, if the blade becomes dull, the blade and rotor assembly may readily be removed and the cutting blade rotated by 180 degrees and replaced in the cast cutter. The method of keying the blade to the shaft may take the form of any well known keying structure such as, for example, a slotted shaft, or a non-circular cross section shaft, etc.

A modification of the basic concept shown in FIGS. 1–7 is illustrated in FIG. 8. Referring to FIG. 8, the cutting blade 13 is mounted adjacent a single rotor 80 having an arcuate shape and including a plurality of permanent magnets 81 embedded therein. The single stator 82 is adjacent and axially displaced from the rotor and includes a plurality of windings 83 wound so as to yield alternating polarities for any given polarity of impressed electrical current. The alternation or reversal of electric current provided to the respective stator windings reverses the generated magnetic field and causes the permanent magnets embedded in the armature to alternately align themselves with adjacent stator windings.

A further modification is shown in FIG. 9 wherein the cutting blade 13 is provided with a pair of soft iron pieces 90 and 91 mounted diametrically from each other. Each of the soft iron pieces includes a portion 92 and 93, respectively, extending perpendicularly to the plane of a cutting blade 13. Stators 94 and 95 are provided for the respective soft iron pieces and each includes a corresponding station winding 96 and 97. The stator windings are alternately energized in accordance with the current provided to the stator windings through corresponding diodes 98 and 99.

The present invention therefore provides a cast cutter that may be utilized to remove the plaster cast from a patient without fear of injury if the cutting blade contacts the patient. The design of the present invention provides a light, compact instrument that operates efficiently and quitely, thereby alleviating the difficulties caused by present cast cutters with their attendant bulk and irritating noise. It will be apparent to those skilled in the art that many modifications may be made in the present invention without departing from the spirit and scope thereof.

What is claimed is:
1. A cast cutter comprising:
   (a) a cutting blade mounted for rotation about an axis;
   (b) a stator for generating an alternating magnetic field in response to an impressed alternating current;
   (c) rotor means responsive to said alternating magnetic field for alternately accelerating said rotor in one direction and in the opposite direction;
   (d) means securing said rotor to said cutting blade for accelerating said blade and forcing it to oscillate about said axis; and
   (e) means including a vacum port adjacent said cutting blade for conducting particles dislodged by said blade away from said cutter.
2. A cast cutter comprising:
   (a) a supporting frame;
   (b) a circular cutting blade mounted in said frame for rotation about an axis;
   (c) a stator secured to said frame for generating an alternating magnetic field in response to an impressed alternating current;
   (d) rotor means responsive to said alternating magnetic field for alternately accelerating said rotor in one direction and in the opposite direction;
   (e) means securing said rotor to said cutting blade for accelerating said blade and forcing it to oscillate about said axis;
   (f) means including a vacum port integral with said frame adjacent said cutting blade for conducting particles dislodged by said blade away from said cutter.
3. In a cast cutter, the improvement comprising:
   (a) a cutting blade mounted for rotation about an axis;
   (b) a pair of arcuate stators, positioned on either side of and displaced axially of said cutting blade; for generating an alternating magnetic field in response to an impressed alternating current;
   (c) a pair of arcuate rotor means, secured to either side of said cutting blade, each having a digitated circumference;
   (d) said rotor means responsive to said alternating magnetic field for accelerating said blade and forcing it to oscillate about said axis.
4. A cast cutter comprising:
   (a) a cutting blade mounted for rotation about an axis;
   (b) a stator, positioned axially of said cutting blade, for generating an alternating magnetic field in response to an impressed alternating current;
   (c) rotor means, secured to said cutting blade, having a digitated circumference;
   (d) said rotor means responsive to said alternating magnetic field for accelerating said blade and forcing it to oscillate about said axis; and
   (e) means including a vacum port adjacent said cutting blade for conducting particles dislodged by said blade away from said cutter.
5. A cast cutter comprising:
   (a) a cutting blade mounted for rotation about an axis;
   (b) a pair of arcuate stators, positioned on either side of and displaced axially of said cutting blade, for generating an alternating magnetic field in response to an impressed alternating current;
   (c) a pair of arcuate rotor means, secured to either side of said cutting blade, each having a digitated circumference;
   (d) said rotor means responsive to said alternating magnetic field for accelerating said blade and forcing it to oscillate about said axis; and
   (e) means including a vacum port adjacent said cutting blade for conducting particles dislodged by said blade away from said cutter.
6. A cast cutter comprising:
   (a) a supporting frame;
   (b) a circular cutting blade mounted in said frame for rotation about an axis;
   (c) a pair of arcuate stators secured to said frame, positioned on either side of and displaced axially of said cutting blade, for generating an alternating magnetic field in response to an impressed alternating current;
   (d) a pair of arcuate rotor means, secured to either side of said cutting blade, each having a digitated circumference;
   (e) said rotor means responsive to said alternating magnetic field for accelerating said blade and forcing it to oscillate about said axis;
   (f) means including a vacum port integral with said frame adjacent said cutting blade for conducting particles dislodged by said blade away from said cutter.
7. In a cast cutter, the improvement comprising:
   (a) a cutting blade mounted for rotation about an axis;
   (b) a pair of laminated stators having opposing pole faces each
      (1) arcuately shaped with each pole face forming a portion of a sector,
      (2) spaced axially from said cutting blade, one on either side;
   (c) a pair of stator windings, each
      (1) mounted on a corresponding one of said stators,
      (2) connected to receive a half wave rectified alternating current each stator receiving a different half wave of the rectified current;
(d) a pair of rotors each
(1) arcuately shaped,
(2) having the circumference thereof digitated forming radially extending teeth;
(3) axially displaced from a corresponding one of said stators;
(e) means securing said rotors to opposite sides of said cutting blade with the radially extending teeth of one rotor angularly displaced relative to the radially extending teeth of the other rotor.

8. In a cast cutter, the improvement comprising:
(a) a cutting blade mounted for rotation about an axis;
(b) a pair of laminated stators having opposing pole faces each
(1) arcuately shaped with each pole face forming a portion of a sector,
(2) spaced axially from said cutting blade, one on either side;
(c) a pair of stator windings, each
(1) mounted on a corresponding one of said stators,
(2) connected to receive a half wave rectified alternating current each stator receiving a different half wave of the rectified current;
(d) a pair of rotors each
(1) arcuately shaped,
(2) having the circumference thereof digitated forming radially extending teeth;
(3) axially displaced from a corresponding one of said stators;
(e) means securing said rotors to opposite sides of said cutting blade with the radially extending teeth of one rotor angularly displaced relative to the radially extending teeth of the other rotor.
(f) means including a vacuum port adjacent said cutting blade for conducting particles dislodged by said blade away from said cutter.

9. A cast cutter comprising:
(a) a supporting frame;
(b) a cutting blade mounted in said frame for rotation about an axis;
(c) a pair of stators secured to said frame and having opposing pole faces, each
(1) arcuately shaped with each pole face forming a portion of a sector,
(2) spaced axially from said cutting blade, one on either side;
(d) a pair of stator windings, each
(1) mounted on a corresponding one of said stators,
(2) connected to receive a half wave rectified alternating current, each stator receiving a different half wave of the rectified current;
(e) a pair of rotors each
(1) arcuately shaped,
(2) having the circumference thereof digitated forming radially extending teeth,
(3) axially displaced from a corresponding one of said stators,
(f) means securing said rotors to opposite sides of said cutting blade with the radially extending teeth of one rotor angularly displaced relative to the radially extending teeth of the other rotor.

10. A cast cutter comprising:
(a) a supporting frame;
(b) a cutting blade mounted in said frame for rotation about an axis;
(c) a pair of stators secured to said frame and having opposing pole faces, each
(1) arcuately shaped with each pole face forming a portion of a sector,
(2) spaced axially from said cutting blade, one on either side;
(d) a pair of stator windings, each
(1) mounted on a corresponding one of said stators,
(2) connected to receive a half wave rectified alternating current, each stator receiving a different half wave of the rectified current;
(e) a pair of rotors each
(1) arcuately shaped,
(2) having the circumference thereof digitated forming radially extending teeth,
(3) axially displaced from a corresponding one of said stators,
(f) means securing said rotors to opposite sides of said cutting blade with the radially extending teeth of one rotor angularly displaced relative to the radially extending teeth of the other rotor;
(g) means including a vacuum port integral with said frame adjacent said cutting blade for conducting particles dislodged by said blade away from said cutter.

11. In a cast cutter, the improvement comprising:
(a) a cutting blade mounted for rotation about an axis;
(b) a pair of stators having opposing pole faces, each
(1) arcuately shaped with each full face forming a portion of a sector,
(2) spaced axially from said cutting blade, one on either side,
(3) said pole faces of each stator angularly displaced relative to the corresponding pole faces of the other stator;
(c) a pair of stator windings each
(1) mounted on a corresponding one of said stators,
(2) connected to receive a half wave rectified alternating current, each stator receiving a different half wave of the rectified current;
(d) a pair of rotors each
(1) arcuately shaped,
(2) having their circumference thereof digitated forming radially extended teeth,
(3) axially displaced from a corresponding one of said stators;
(e) means for securing said rotors to opposite sides of said cutting blade.

12. In a cast cutter, the improvement comprising:
(a) a cutting blade mounted for rotation about an axis;
(b) a pair of stators having opposing pole faces, each
(1) arcuately shaped with each full face forming a portion of a stator,
(2) spaced axially from said cutting blade, one on either side,
(3) said pole faces of each stator angularly displaced relative to the corresponding pole faces of the other stator;
(c) a pair of stator windings each
(1) mounted on a corresponding one of said stators,
(2) connected to receive a half wave rectified alternating current, each stator receiving a different half wave of the rectified current;
(d) a pair of rotors each
(1) arcuately shaped,
(2) having their circumference thereof digitated forming radially extended teeth,
(3) axially displaced from a corresponding one of said stators;
(e) means for securing said rotors to opposite sides of said cutting blade;
(f) means including a vacuum port adjacent said cutting blade for conducting particles dislodged by said blade away from said cutter.

13. A cast cutter comprising:
(a) a supporting frame;

(b) a cutting blade mounted in said frame for rotation about an axis;
(c) a pair of stators mounted in said frame having opposing pole faces, each
  (1) arcuately shaped with each pole face forming a portion of a sector,
  (2) spaced axially from said cutting blade, one on either side,
  (3) said pole faces of each stator angularly displaced relative to the corresponding pole faces of the other stator;
(d) a pair of stator windings, each
  (1) mounted on a corresponding one of said stators,
  (2) connected to receive a half wave rectified alternating current, each stator receiving a different half wave of the rectified current;
(e) a pair of rotors each
  (1) arcuately shaped,
  (2) having the circumference thereof digitated forming radially extending teeth,
  (3) axially displaced from a corresponding one of said stators;
(f) means securing said rotors to opposite sides of said cutting blade;
(g) means including a vacuum port integral with said frame adjacent said cutting blade for conducting particles dislodged by said blade away from said cutter.

References Cited by the Examiner
UNITED STATES PATENTS

| | | | |
|---|---|---|---|
| 733,587 | 7/03 | Hylton-Bravo | 310—67 |
| 1,563,727 | 12/25 | Curtis | 318—129 |
| 2,103,356 | 12/37 | Fisher | 310—163 |
| 2,351,623 | 1/44 | Martin | 310—29 |
| 2,780,764 | 2/57 | Morrison | 310—163 |
| 2,827,578 | 3/58 | Carissini et al. | 310—38 |
| 3,105,163 | 9/63 | Camp | 310—38 |

WILLIAM FELDMAN, *Primary Examiner.*

MILTON S. MEHR, *Examiner.*